(12) United States Patent
Klumpp et al.

(10) Patent No.: US 10,108,186 B2
(45) Date of Patent: Oct. 23, 2018

(54) ADAPTIVE WORKSTATION ASSEMBLY IN PRODUCTION PROCESSING

(75) Inventors: Willi Klumpp, Ostfildern (DE); Matthias Reichenbach, Stuttgart (DE); Matthias Schreiber, Bietigheim-Bissingen (DE); Volker Zipter, Stuttgart (DE); Michael Zuern, Sindelfingen (DE)

(73) Assignee: Daimler AG, Stuttgart (DE)

( * ) Notice: Subject to any disclaimer, the term of this patent is extended or adjusted under 35 U.S.C. 154(b) by 522 days.

(21) Appl. No.: 14/363,476

(22) PCT Filed: Dec. 9, 2011

(86) PCT No.: PCT/EP2011/006201
§ 371 (c)(1),
(2), (4) Date: Jun. 6, 2014

(87) PCT Pub. No.: WO2013/083142
PCT Pub. Date: Jun. 13, 2013

(65) Prior Publication Data
US 2014/0288690 A1   Sep. 25, 2014

(51) Int. Cl.
*G05B 19/41*     (2006.01)
*B23P 21/00*     (2006.01)
*G05B 19/418*    (2006.01)

(52) U.S. Cl.
CPC ........ *G05B 19/4189* (2013.01); *B23P 21/004* (2013.01); *G05B 19/4188* (2013.01);
(Continued)

(58) Field of Classification Search
CPC ............ G05B 14/4189; G05B 19/4188; G05B 2219/32085; G05D 1/0212;
(Continued)

(56) References Cited

U.S. PATENT DOCUMENTS 4,304,020 A * 12/1981 Bonnet ................ A43D 111/00
                                                    12/1 A
4,548,346 A * 10/1985 Kraus ................... B23P 21/004
                                                    198/339.1
(Continued)

FOREIGN PATENT DOCUMENTS

DE             36 14 165 A1   10/1987
DE   10 2004 029 665 A1       10/2005
(Continued)

OTHER PUBLICATIONS

Japanese Office Action issued in counterpart Japanese Application No. 2014-545101 dated Jul. 21, 2015, with partial English translation (Nine (9) pages).
(Continued)

*Primary Examiner* — Mohammad Ali
*Assistant Examiner* — Kelvin Booker
(74) *Attorney, Agent, or Firm* — Crowell & Moring LLP

(57) ABSTRACT

A method to operate a production plant having a plurality of work regions in which respective work stations are arranged to carry out at least on respective work step, and having at least one transport system that transports goods to be processed on at least one predetermined path between the work stations, involves selecting the arrangement of the work stations, the work step that is able to be carried out by the respective work station, and the at least one predetermined path according to at least one predetermined criterion that is related to a production requirement, and adapting these due to a change of the at least one criterion.

11 Claims, 2 Drawing Sheets

Figure 1:
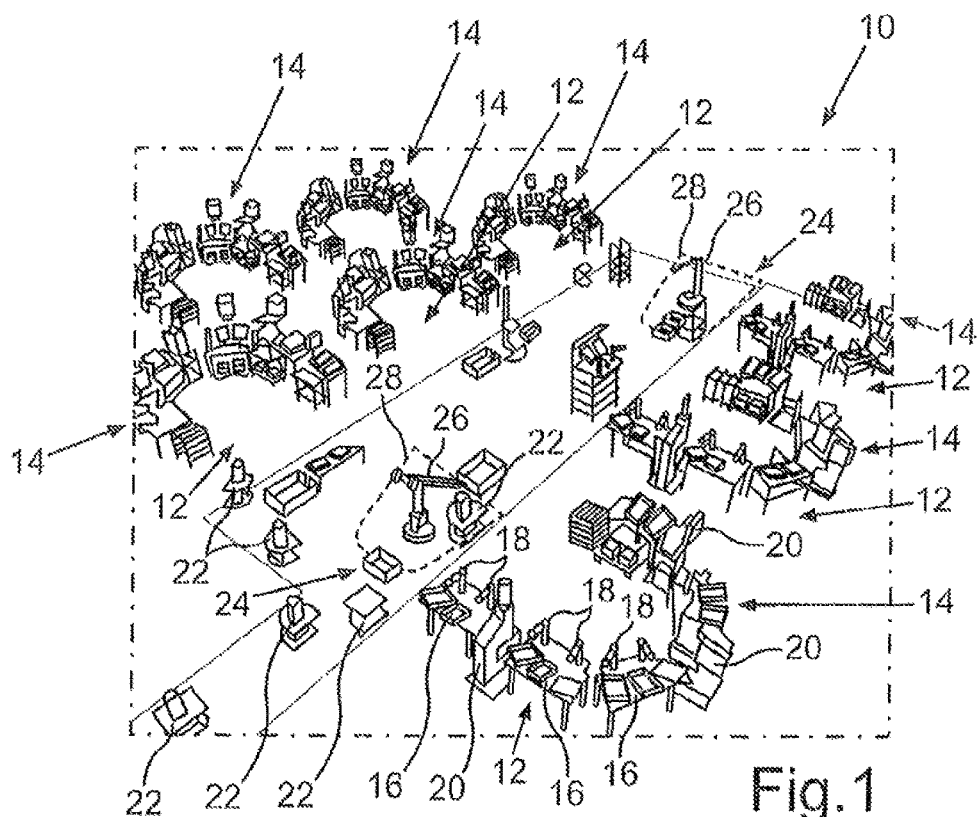

(52) U.S. Cl.
CPC ..... *G05B 2219/32085* (2013.01); *Y02P 90/24* (2015.11); *Y02P 90/28* (2015.11)

(58) Field of Classification Search
CPC .......... G05D 2201/0216; B23B 21/004; Y02P 90/28; Y02P 90/24
See application file for complete search history.

(56) References Cited

U.S. PATENT DOCUMENTS

| | | | | |
|---|---|---|---|---|
| 4,653,159 | A * | 3/1987 | Henderson | H01B 13/01245 140/93 R |
| 4,703,558 | A * | 11/1987 | Makinen | B23P 21/00 198/346 |
| 4,738,387 | A * | 4/1988 | Jaufmann | B23K 37/047 193/35 R |
| 4,773,523 | A * | 9/1988 | Hansen, Jr. | G05B 19/4182 198/418.2 |
| 4,815,190 | A * | 3/1989 | Haba, Jr. | B23P 21/004 198/346.1 |
| 4,894,908 | A * | 1/1990 | Haba, Jr. | B23P 21/004 29/711 |
| 4,928,383 | A * | 5/1990 | Kaczmarek | B23P 21/004 29/711 |
| 4,982,827 | A * | 1/1991 | Seitz | B23Q 7/14 198/341.07 |
| 5,019,968 | A * | 5/1991 | Wang | G06F 9/30032 708/520 |
| 5,119,732 | A * | 6/1992 | Lisy | E01B 23/00 104/102 |
| 5,125,149 | A * | 6/1992 | Inaba | B23P 19/001 198/341.05 |
| 5,189,604 | A * | 2/1993 | Lovrenich | G05B 19/058 700/18 |
| 5,210,821 | A * | 5/1993 | Yazaki | G05B 19/4083 700/248 |
| 5,239,739 | A * | 8/1993 | Akeel | B23K 37/047 29/430 |
| 5,268,837 | A * | 12/1993 | Saylor | B25J 9/1661 700/248 |
| 5,272,805 | A * | 12/1993 | Akeel | B23K 37/047 29/712 |
| 5,280,431 | A * | 1/1994 | Summerville | G05D 1/0246 180/168 |
| 5,525,882 | A * | 6/1996 | Asaka | G05D 1/0251 318/568.16 |
| 5,528,116 | A * | 6/1996 | Snell | B25J 9/1692 318/568.13 |
| 5,747,894 | A * | 5/1998 | Hirai | H01F 38/14 29/592.1 |
| 5,771,553 | A * | 6/1998 | Sim | B25J 9/1687 29/407.09 |
| 5,997,670 | A * | 12/1999 | Walter | B29C 63/0056 150/166 |
| 6,213,309 | B1 * | 4/2001 | Dadisho | B07C 5/362 198/450 |
| 6,429,016 | B1 * | 8/2002 | McNeil | G01N 35/0099 414/222.02 |
| 6,516,239 | B1 * | 2/2003 | Madden | G05B 19/41815 198/349 |
| 6,535,786 | B1 * | 3/2003 | Duemler | G05B 19/41845 700/112 |
| 6,651,799 | B1 * | 11/2003 | Rice | B23Q 1/0054 198/345.3 |
| 6,668,203 | B1 * | 12/2003 | Cook | G05B 23/0229 700/27 |
| 7,490,710 | B1 * | 2/2009 | Weskamp | B23Q 7/1426 198/345.3 |
| 2001/0032772 | A1 * | 10/2001 | Oldford | B62D 65/18 198/345.3 |
| 2001/0044997 | A1 * | 11/2001 | Oldford | B23P 21/004 29/407.1 |
| 2002/0073652 | A1 * | 6/2002 | Wiedemann | A23L 3/02 53/425 |
| 2002/0084762 | A1 * | 7/2002 | Kurokawa | G05B 19/19 318/560 |
| 2002/0157241 | A1 * | 10/2002 | Yamamoto | B23P 21/004 29/705 |
| 2002/0198618 | A1 * | 12/2002 | Madden | B62D 65/02 700/101 |
| 2005/0047895 | A1 * | 3/2005 | Lert, Jr. | B65G 1/0492 414/273 |
| 2007/0204454 | A1 * | 9/2007 | Hibbler | B23P 21/004 29/429 |
| 2008/0112787 | A1 * | 5/2008 | Rebstock | H01L 21/67201 414/749.1 |
| 2009/0012642 | A1 | 1/2009 | Mertens et al. | |
| 2009/0028669 | A1 * | 1/2009 | Rebstock | B25J 15/0052 414/1 |
| 2009/0074545 | A1 * | 3/2009 | Lert, Jr. | B65G 1/0492 414/276 |
| 2009/0112343 | A1 * | 4/2009 | Yuan | G05B 19/41865 700/101 |
| 2009/0112350 | A1 * | 4/2009 | Yuan | G05B 19/41835 700/117 |
| 2009/0118858 | A1 * | 5/2009 | Wallace | B23P 19/001 700/110 |
| 2011/0110886 | A1 * | 5/2011 | Braddock | A61K 31/047 424/85.2 |
| 2011/0209321 | A1 * | 9/2011 | Kilibarda | G06Q 10/06 29/426.1 |
| 2011/0243707 | A1 * | 10/2011 | Dumas | B65B 5/105 414/806 |
| 2011/0282476 | A1 * | 11/2011 | Hegemier | G06Q 30/0621 700/100 |
| 2011/0314665 | A1 * | 12/2011 | Kilibarda | B23P 19/001 29/783 |
| 2012/0089295 | A1 * | 4/2012 | Ahn | G05D 1/0242 701/28 |
| 2012/0165968 | A1 * | 6/2012 | Fontanot | G05B 19/41865 700/101 |
| 2013/0325159 | A1 * | 12/2013 | Kilibarda | G05B 15/02 700/114 |
| 2013/0334839 | A1 * | 12/2013 | Grevener | B62D 25/2009 296/193.07 |
| 2014/0007432 | A1 * | 1/2014 | Grevener | B62D 65/12 29/897.2 |
| 2014/0042773 | A1 * | 2/2014 | Grevener | B62D 29/043 296/181.1 |
| 2014/0067109 | A1 * | 3/2014 | Kawai | B23Q 17/2428 700/112 |
| 2014/0082918 | A1 * | 3/2014 | Grevener | B62D 25/2009 29/469 |
| 2014/0303767 | A1 * | 10/2014 | Klumpp | G05B 19/41845 700/105 |
| 2014/0303768 | A1 * | 10/2014 | Klumpp | B23P 19/001 700/113 |

FOREIGN PATENT DOCUMENTS

| | | |
|---|---|---|
| DE | 10 2007 047 279 A1 | 4/2009 |
| FR | 2 606 178 A1 | 5/1988 |
| JP | 63-177208 A | 7/1988 |
| JP | 8-229757 A | 9/1996 |
| JP | 2001-1237 A | 1/2001 |
| JP | 2002-36073 A | 2/2002 |
| JP | 2011-702 A | 1/2011 |
| JP | 2011-51056 A | 3/2011 |

OTHER PUBLICATIONS

Japanese Office Action issued in Japanese counterpart application No. 2014-545101 dated Mar. 8, 2016, with partial English translation (Seven (7) pages).

Corresponding International Search Report dated Aug. 27, 2012, with English Translation (six (6) pages).

(56) References Cited

OTHER PUBLICATIONS

German-language Written Opinion (PCT/ISA/237) dated Aug. 27, 2012 (seven (7) pages).
Chinese Office Action issued in Chinese counterpart application No. 201180075406.0 dated May 5, 2016, with partial English translation (Eleven (11) pages).
Japanese-language Office Action issued in counterpart Japanese Application No. 2014-545101 dated Jan. 24, 2017 with partial English translation (6 pages).

* cited by examiner

ADAPTIVE WORKSTATION ASSEMBLY IN PRODUCTION PROCESSING

BACKGROUND AND SUMMARY OF THE INVENTION

Exemplary embodiments of the present invention relate to a method to operate a production plant having a plurality of work regions.

Production plants known from prior art are usually constructed to be rigid and inflexible. In particular, the conveyor technology used is installed in a fixed manner and therefore does not allow an adaptation of the production plant depending on load.

German patent document DE 10 2004 029 665 discloses a modular transfer system for work pieces that makes it possible to completely dispense with separate conveyor systems. The transfer system comprises a plurality of CNC machines arranged to be directly adjacent to one another and the servo motor drive of which is designed to transfer work pieces between the individual machines.

Furthermore, German patent document DE 10 2007 047 279 A1 discloses a production plant comprising a transport system that is fixedly installed and connects several processing stations to one another. Different work tasks can be carried out at the processing stations depending on load, in order to increase the flexibility of the production line.

Exemplary embodiments of the present invention are directed to a method that provides a particularly flexible adaptation of the production plant to different production requirements.

Such a method serves to operate a production plant having a plurality of work regions in which respective work stations are arranged to carry out at least on respective work step. Furthermore, such a production plant comprises at least one transport system, by means of which goods to be processed are transported on at least one predetermined path between the work stations. For this purpose, the arrangement of the workstations, the work step that is able to be carried out by the respective work station as well as the at least one predetermined path is selected according to a predetermined criterion that relates to a production requirement and is adapted in the case of a change of the at least one criterion.

As opposed to the method known from prior art to operate production plants, a flexible adaptation of the operation of the production plant to respective current production requirements is enabled by the method according to the invention. The arrangement and the number of work stations, the work steps to be carried out and the connection of the work stations to one another by means of a transport system can be adapted on a daily basis in reaction to changing production requirements. In order to enable this, the components of the production plant are preferably all designed to be moveable, such that new arrangements and transport paths can be created in the shortest amount of time. For this purpose, it is expedient to use lightweight robots that can be re-configured quickly. Unmanned industrial trucks are particularly suitable as a transport system, the industrial trucks, for example, navigating autonomously or following an externally predetermined track that, for example, is laid on the floor. This enables a particularly quick adaptation of the transport path within the production plant, for example by simply giving new commands. Overall, such a particularly flexible method to operate the production plan is created, which enables the plant to adapt very quickly to changing requirements for the number of pieces or variant requirements without having to carry out large re-construction.

Preferably, work stations are used within the scope of the method that are formed as substantially identical modules. Such modules can be assembly robots corresponding to one another with regard to their hardware. These robots receive a respective updated programming in reaction to the respective current production requirement. As well as the flexible adaptation to the production requirements, the use of such modules can in particular be used for the quick exchange of extended stations. Furthermore, the modules can also be constructed to be more complex and can comprise several respective machine tools, racks, robots or similar. In such more complex modules, a plurality of work steps can be carried out respectively. It is, for example, possible to provide such an individual module for each variant of a product to be produced or also to install several modules for the same variant, if a particularly high number of pieces is to be produced. Preferably, such modules then work in parallel, in order to enable particularly high product throughputs. The products of such work stations that work in parallel can be transported further to an individual work station by the transport system, where they are processed further. Such branching and parallelization in the flow of goods into the production plant enable a particularly flexible adaptation of the operation of the production plant to the current production requirements.

Furthermore, it is expedient to provide a predetermined number of unequipped work regions equipped with a work station in case of an increase of the production requirement. By the addition of further work stations in such free work regions, overloading of individual work stations can be compensated for or the number of pieces can be increased to requirement.

Overall, a method is thus created having comparable cycle times to known production plants that are installed in a fixed manner and can, at the same time, be adapted within the shortest amount of time to new requirements due to the flexibility of the transport path, the possibility of the parallel processing of several products in work stations that are connected in parallel as well as the possibility to dispense with transport paths and to join them again.

With the help of the method according to the invention, it can be possible to carry out assembly work, for which hitherto complete assembly lines including the necessary conveyor technology were used, in work stations, which ideally consist only of one assembly table, which is operated by one or two human workers or assembly robots. In this way, a clearly smaller area is needed for the assembly task. Furthermore, the requirement for conveyor technology that is installed in a fixed manner is reduced to the absolutely minimum necessary, which greatly reduces the investment costs.

BRIEF DESCRIPTION OF THE DRAWING FIGURES

The invention and its embodiments are described in more detail below by means of the drawing.

Figure 2:
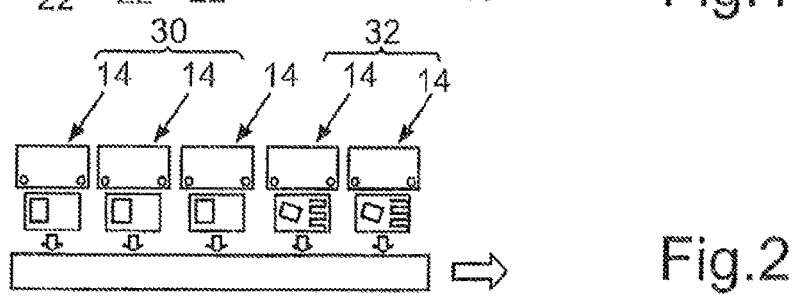
Figure 3:
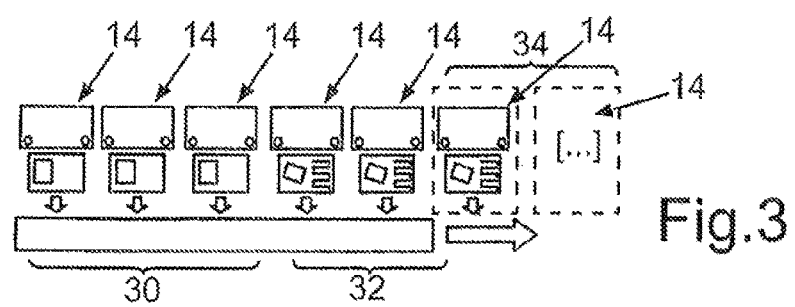
Figure 4:
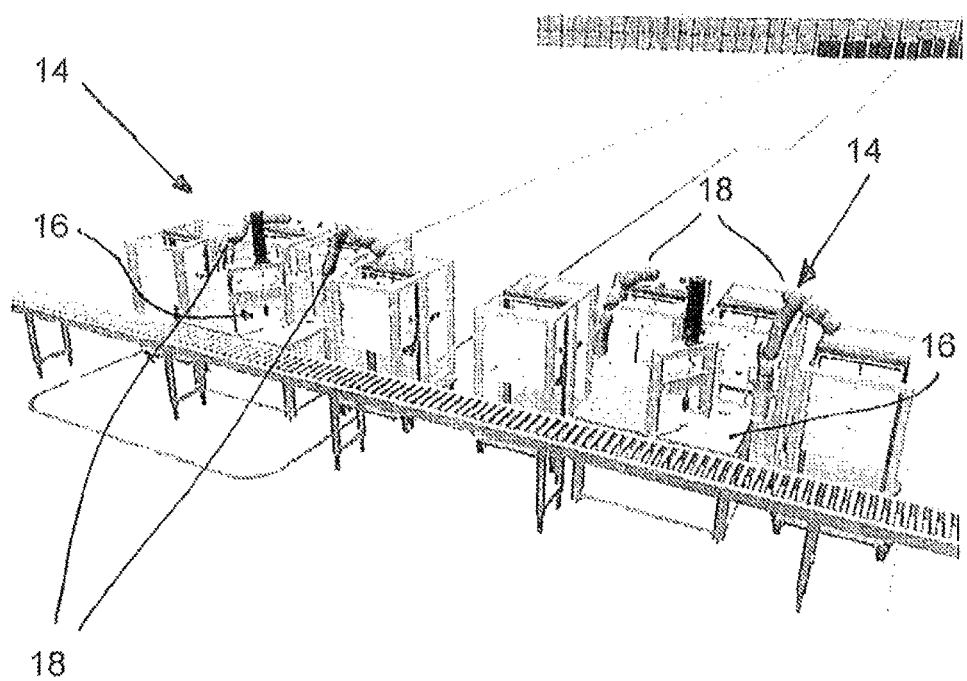

Here are shown:

FIG. 1 a perspective view of a production plant for use with an exemplary embodiment of a method according to the invention and FIG. 2 to 4 three alternative arrangements of work stations for use with an exemplary embodiment of a method according to the invention.

DETAILED DESCRIPTION

An overall production plant referred to by 10 to produce motor vehicle gears comprises a plurality of work regions in which respective work stations 14 are arranged. The work stations 14 comprises several work tables 16 respectively equipped with lightweight robots 18 as well as several presses 20 or other machine tools necessary for the respective production task. Furthermore, a work station can also comprise racks or storage containers for components.

Unmanned and self-navigating industrial trucks 22 are provided to transport goods between the work stations 14. Further work stations 24 having robots 26 that are installed in a fixed manner serve to provide the parts. In order to enable humans and robots to work in parallel, the robots 18, 26 in this exemplary embodiment are protected by a schematically depicted laser cone 28. If a person moves into the region of the laser cone 28, then the robots 18, 26 are automatically deactivated in order to protect the workers. As an alternative to the laser cones, robots 18, 26 can also be used that have force/torque sensors, with the help of which collisions of the robots 18, 26 with one another, with other elements of the work station or, in particular, with workers can be avoided.

Both the lightweight robots 18 and the tables 16 are able to be arranged freely in the different work regions 12. The work stations 14 can therefore be reconfigured without problem depending on a production requirement, for example a number of pieces or number or variants of the goods to be produced. This relates both to the arrangement in the space and the work tasks carried out by the respective work stations 14. If the tasks of a work station 14 change, then the lightweight robots 18 can be reprogrammed without problem. In order to compensate for overloading of the production plant 10, empty work regions 12 can be provided in which new work stations 14 are constructed in case of an increased production requirement. The order in which the work stations 14 carry out their processing steps can likewise be freely adapted, as no fixed transport systems are necessary. Furthermore, the transport paths between the work stations 14 are set freely by corresponding re-programming of the unmanned industrial trucks 22.

The work stations 14 can carry out identical or different work volumes. Two examples of this are shown in FIGS. 2 and 3. In the case of the arrangement according to FIG. 2, a first variant of a component is produced in a first group 30 of three work stations 14. Parallel to this, a second variant of component is produced at a second group 32 of two work stations 14. The products of the work stations 14 of the groups 30 and 32 are then bundled together by transport systems and conducted together to a final assembly station. A particularly high throughput is achieved by the parallel processing. At the same time, the production can be adapted without problem and quickly to changed requirements by the addition of a new group 34 of work stations 14. For example, a further variant of the component to be produced can be taken on in the production process by the addition of a further group 34 or also additional groups that are not shown. For this reason, no changes of any kind have to be made to the already present work stations of the groups 30, 32, which can continue their production unchanged. The addition of work stations 14, which produce an already present variant, is also possible in order to increase the number of pieces produced.

In a further exemplary embodiment, which is shown in FIG. 4, a work station 14 also consists only, as is shown in FIG. 4, of an individual work table 16 having allocated racks or storage containers. This can then be operated by one or several assembly robots 18 or human workers. Ideally, such an individual work table 16 replaces a complete assembly line and therefore creates large free assembly areas, as is depicted in FIG. 4 as an example. Furthermore, the reduction of the assembly line to one individual work table 16 enables the omission of expensive and inflexible conveyor technology that is installed in a fixed manner.

Preferably, all work stations 14 are designed such that all work carried out at them can be carried out both by lightweight robots 18 and by human workers. If, for example, only a very low number of pieces of a determined variant need to be produced, then work stations 14 for the production of this variant can be replaced with human workers instead of robots, while high numbers of pieces are produced purely robotically. The adaptation of the production to new variants is possible without problem using modifications of individual work stations, such that these production requirements can also be fulfilled within the scope of the described method in the simplest way. Due to the mobility of all components of the production plant 10, an even quicker adaptation of the production plant to the current requirements is possible on a daily basis, which provides this with a fundamentally higher flexibility than in the case of the production plants that are installed in a fixed manner, known from prior art.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method of operating a production plant having a plurality of work regions in which no work stations are provided, a plurality of nonempty work regions in which respective work stations are arrange to carry out at least one respective work step, and at least one transport system that transports goods to be processed are transported on at least one predetermined path between the work stations, the method comprising:

selecting, according to at least one predetermined criterion related to a production requirement, an arrangement of the work stations, the work step that is to be carried out by the respective work station, and the at least one predetermined path;

initiating a change in the production requirement of the at least one predetermined criterion;

compensating for overloading of the production plant by providing at least one new work station in at least one of the empty work regions; and adapting, according to the change of the at least one predetermined criterion, a current arrangement of the work stations, the work step that is to be carried out by the respective work station, or the at least one predetermined path, wherein the same work steps are carried out in parallel at a number of the work stations, which are selected depending on a quantity of goods to be produced.

2. The method of claim 1, wherein the work stations are formed as substantially identical modules.

3. The method of claim 1, wherein each of the work stations is equipped with at least one mobile robot.

4. The method of claim 3, wherein a program of the at least one robot is changed due to:
- a re-equipping of a work station with the at least one robot;
- a change of the work station by the at least one robot; or
- a change of the work step to be carried out by the work station.

5. The method of claim 1, wherein a plurality of work steps is carried out at each work station.

6. The method of claim 1, wherein the same work steps are carried out for different product variants in parallel at a number of the work stations, which are selected depending on a quantity and number of product variants to be produced.

7. The method of claim 6, wherein products of the work stations working in parallel are further transported by the transport system to an individual work station, where the produces are processed further.

8. The method of claim 1, wherein products of the work stations working in parallel are further transported by the transport system to an individual work station, where the produces are processed further.

9. The method of claim 1, wherein a predetermined number of unequipped work regions are provided to accommodate a predetermined number of new work stations.

10. The method of claim 2, further comprising transporting goods between the work statins with a self-navigating industrial truck.

11. The method of claim 10, wherein the self-navigating industrial truck is unmanned.

\* \* \* \* \*